W. E. DRESSEL, DEC'D.

THE DRESSEL COLLAPSIBLE RIM MANUFACTURING COMPANY, ASSIGNEE.

COLLAPSIBLE RIM FOR PNEUMATIC TIRES.

APPLICATION FILED JULY 19, 1920.

Reissued May 30, 1922. 15,366.

INVENTOR

W. E. DRESSEL.

BY

Bakewell & Church

ATTORNEYS

UNITED STATES PATENT OFFICE.

WARREN E. DRESSEL, DECEASED, LATE OF EDWARDSVILLE, ILLINOIS, BY THE DRESSEL COLLAPSIBLE RIM MANUFACTURING COMPANY, OF ST. LOUIS, MISSOURI, A CORPORATION OF MISSOURI, ASSIGNEE.

COLLAPSIBLE RIM FOR PNEUMATIC TIRES.

15,366. Specification of Reissued Letters Patent. Reissued May 30, 1922.

Original No. 1,264,622, dated April 30, 1918, Serial No. 146,794, filed February 5, 1917. Application for reissue filed July 19, 1920. Serial No. 397,517.

*To all whom it may concern:*

Be it known that WARREN E. DRESSEL, deceased, late a citizen of the United States, and resident of Edwardsville, in the county of Madison and State of Illinois, invented certain new and useful Improvements in Collapsible Rims for Pneumatic Tires, of which the following is a specification, reference being had to the accompanying drawings.

This invention relates to rims for pneumatic tires, and particularly such rims as are used for quick detachable tires, and the general object of the invention is to provide a rim of this nature constructed of a plurality of sections, so connected to each other that the sections may be collapsed and thus detached from within a pneumatic tire or forced outward into engagement with the tire and held in this position.

A further object of the invention is the provision of a rim of this character made up of sections, all of the sections having detachable interlocking engagement with each other, the sections having abutting engagement with each other when in place and two of the sections being provided with coacting means for locking the sections in their engaged and operative position.

A further object of the invention is to provide a very simple, cheaply constructed and readily operated rim of this character in which the sections shall be positively locked when in position, so that they cannot become accidentally unlocked and detached and in which means are provided for wedging the sections into interlocking engagement with each other. Other objects will appear in the course of the following description.

His invention is illustrated in the accompanying drawings, in which.

Referring to these figures, it will be seen that his improved collapsible rim comprises three sections, A, B and C, the sections B and C being shorter than the section A.

The section A at one end is formed with a transversely extending slot 10, the slot having parallel beveled walls 11, and extending any desired distance across the rim. Preferably one wall of the slot is increased in thickness by thickening the rim section at this point, as at 12, this thickening being accomplished either by riveting or otherwise attaching a separate piece to the rim section, or by forming this thickened portion integrally with the rim section.

Figure 2:
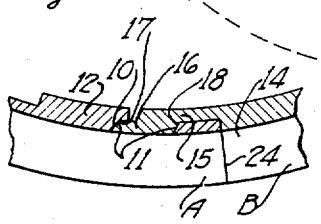
Figure 2 is a fragmentary enlarged longitudinal section of the means for joining the section B to the section A.
Figure 4:
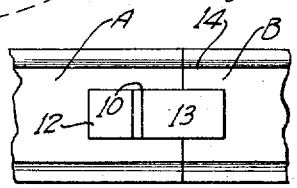
Figure 4 is a top plan view of the construction shown in Figure 2.

The next adjacent section B at its end, which conjoins with the section A, is formed, as illustrated in Figure 2 with a tongue 13 having the same width as the slot 10, this tongue projecting beyond the end 14 of the rim section B and the tongue being either attached to or formed integral with the rim section B. The extremity of the tongue is deflected outward, as at 15, and then forward, as at 16. This portion 16 is beveled upon one face, as at 17, so as to fit against the beveled face 11 of the wall or slot 10, and the opposed face or surface of the portion 16 is beveled, as at 18, so as to fit against the beveled face 11 on the opposite wall of the slot 10. Thus the two faces 17 and 18 are parallel to each other and preferably have an angle of about 20 degrees. Preferably, the thickened portion 12 projects slightly beyond the face of the adjacent wall 11, so that when the deflected end of the tongue 13 is fitted within the slot 10, the outer face of the portion 16 will bear against this slightly projecting edge of the thickened portion 12, as will be seen in Figure 2.

The opposite end of the section B is also provided with a slot 10, having beveled walls 11 and a thickened portion 12, as heretofore described, and the adjacent end of the section C, which is the locking section, is formed with a tongue 13 provided with deflected portions 15 and 16, these deflected portions 15 and 16 being provided with the beveled faces 17 and 18, as heretofore described, so that the section C interlocks with the section B, in exactly the same manner as the section B interlocks with the section A.

Figure 3:
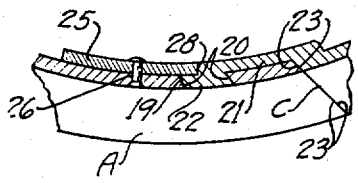
Figure 3 is a longitudinal fragmentary section of the means for joining the section A to the section C.
Figure 5:
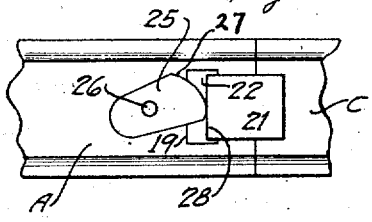
Figure 5 is a top plan view of the construction shown in Figure 3.

The confronting or adjacent ends of the sections A and C are formed as follows and as illustrated in Figure 3. The section A is formed with a slot 19 corresponding in a way to the slot 10, but the opposite walls 20 of this slot are preferably beveled reversely to the walls 11 of the slot 10 and are at an angle of about ten degrees. The section C has formed on it or attached to it, a tongue 21, which tongue is disposed inward of the body of the section and the extremity of this tongue is provided with an outwardly and longitudinally extending locking lug 22 that is adapted to be inserted in the slot 19, the opposite edge faces of this locking lug 22 being beveled at an angle of about ten degrees to correspond with the bevel of the slot 19. The abutting ends of the sections A and C are beveled, as at 23, this bevel being parallel to the beveled faces 20 of the slot 19 and being at an angle of about ten degrees, while the abutting ends of the sections A and B and of the section B with C are radial, these radial ends being designated 24. Pivotally mounted upon the inner face of the section A is a locking cam 25 which is illustrated as pivoted upon a pin, or like member 26, the face of this locking cam being eccentric to this pivot pin, as at 27, so that as the locking cam is turned from its inoperative to its operative position, it will not only extend over the inner side of the longitudinally-projecting lug 22, but will bear against the end face 28 of the tongue 21 and exert an end thrust on same in a direction tending to securely hold the lug 22 in the slot 19.

Figure 1:
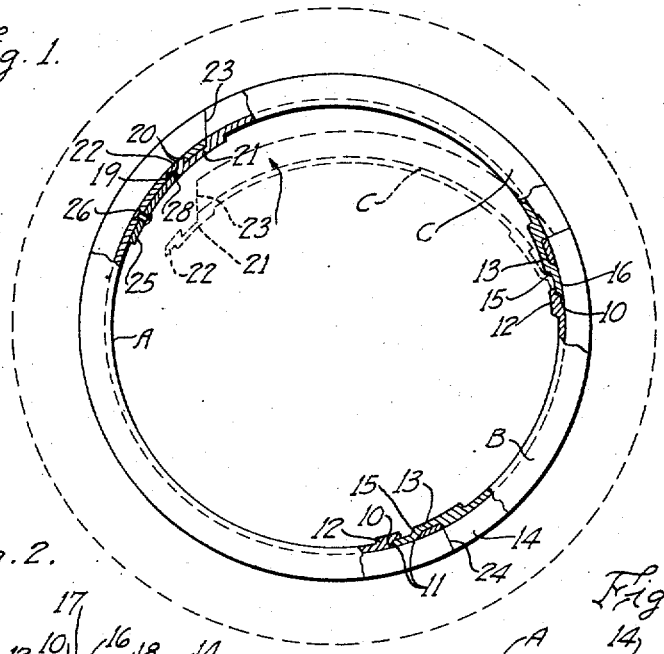
Figure 1 is a side elevation of a collapsible rim constructed in accordance with his invention and partly in section, the view showing, in dotted lines, one section of the rim displaced from its normal position.

To apply the rim to a tire the section A is first inserted in the tire, the section B is then inserted and connected to the right hand end portion of section A by means of the co-operating interlocking portions on said sections and the section C is then inserted and connected to the section B by means of the co-operating tongue and slot on said sections B and C. Thereafter, the section C is swung outwardly from the position shown in broken lines in Figure 1 and is detachably connected to the upper end of the section A, looking at Figure 1, by inserting the lug 22 on the tongue 21 of section C in the slot 19 in the section A and then swinging the locking device or cam 25 into such a position that it will lap over the lug 22 and exert pressure on the tongue 21 in a direction tending to hold the co-operating inclined walls of the lug 22 and slot 19 in snug engagement with each other and also tending to hold the co-operating inclined surfaces on the other sections in snug engagement. To remove the rim from the tire the locking device or cam 25 is first moved into a position to release the lug 22 on the movable section C and permit said section C to be swung inwardly into the position shown in broken lines in Figure 1. The section C is then disconnected from the section B and thereafter the section B is disconnected from the section A.

While there is herein illustrated a rim composed of three sections, it is to be understood that a different number of sections could be used to form the rim, and further, that the particular means employed for detachably connecting the free end of the movable section C of the rim to the adjacent section or portion of the rim is applicable to any type of transversely split tire rim in which one portion or section of the rim can be swung inwardly towards the center of the rim to facilitate the withdrawal of the rim from the tire in which it is arranged.

It will be obvious that it is very easy to apply this collapsible rim to a new tire, or to a tire which would ordinarily be so tight as would make it difficult to apply the usual rim. Furthermore, it will not be necessary to use tire tools for the purpose of forcing the tire onto a rim, and thus a saving in tires will be effected. Furthermore, it is often the case that a tire rusts on a rim and in that case it is extremely difficult to force the tire off of the rim, whereas no difficulty of this kind is experienced with this collapsible rim.

The reason for having the faces 17 and 18 of the tongue 16 at an angle is so that the tongue will draw from its seat when the section that carries said tongue is forced inwardly. By actual experiment it is found that the angle of 20° is particularly advantageous. The angular faces 20 of the slot 19 are preferably beveled at an angle of about 10°, that is, the same angle at which the rim is cut, as at 23, and consequently, when the rim is broken at this point to remove the rim from the tire, the tendency will be to retract to a smaller circle. The angle of the faces 20 permits the sections of the rim to be separated readily, and when the rim is replaced within the tire, the key and rim sections receive equal pressure when the tire is inflated. Another function of the cam or locking device 25 is to hold the key or lug 22 in its seat when the tire is deflated, as, for instance, when the tire is punctured. Without this locking device 25 there would be danger that the rim sections might jar apart with the tire deflated and fall from the tire. While the sections B and C of the rim are illustrated as being shorter than the section A, it is to be understood that they might all be of the same size.

It is not desired to limit the invention to any particular formation of the rim for engagement with the tire, as the means whereby the rim may be collapsed or the rim sections held in engagement with each other may be applied equally well either to a straight sided tire or a tire of the clencher type.

Having thus described this invention, what is claimed is:

1. A collapsible rim for tires, comprising a plurality of segments, one of which has a tongue at each end, another of which has a slot at each end, and the third of which has a slot at one end and a tongue at the other end, one of said slots having parallel walls beveled outward and towards the adjacent end of its segment, the coacting tongue having a locking lug beveled to fit said slot, and a cam pivoted on the end of said last mentioned segment adjacent said slot and adapted to engage over said lug and bear against the end of the tongue.

2. A collapsible rim for tires, comprising a plurality of arcuate segments, one of which has a tongue at each end, another of which has a slot at each end, and a third of which has a tongue at one end and a slot at the other, the walls of said last mentioned slot being beveled to fit the corresponding beveled walls of the coacting tongue, and locking means to hold said last mentioned slot and tongue in engagement.

[L. S.] THE DRESSEL COLLAPSIBLE RIM MANUFACTURING COMPANY,

By WILBUR A. TRARES,

*President.*

*Assignee, by mesne assignments, of Warren E. Dressel, deceased.*